(12) United States Patent
Pause

(10) Patent No.: US 7,241,509 B2
(45) Date of Patent: Jul. 10, 2007

(54) WALL COVERING ASSEMBLY WITH THERMO-REGULATING PROPERTIES

(76) Inventor: Barbara Pause, 7161 Christopher Ct., Longmont, CO (US) 80503

( * ) Notice: Subject to any disclaimer, the term of this patent is extended or adjusted under 35 U.S.C. 154(b) by 266 days.

(21) Appl. No.: 10/533,363

(22) PCT Filed: Oct. 15, 2003

(86) PCT No.: PCT/US03/32595

§ 371 (c)(1),
(2), (4) Date: Apr. 29, 2005

(87) PCT Pub. No.: WO2004/044345

PCT Pub. Date: May 27, 2004

(65) Prior Publication Data

US 2005/0244625 A1 Nov. 3, 2005

Related U.S. Application Data

(60) Provisional application No. 60/424,198, filed on Nov. 5, 2002.

(51) Int. Cl.
*B32B 21/06* (2006.01)
*B32B 29/00* (2006.01)

(52) U.S. Cl. .................................. 428/535; 428/537.5
(58) Field of Classification Search ................ 428/535, 428/537.5
See application file for complete search history.

(56) References Cited

U.S. PATENT DOCUMENTS

| | | | | |
|---|---|---|---|---|
| 5,260,118 A | * | 11/1993 | Lussi et al. | 428/203 |
| 5,626,936 A | * | 5/1997 | Alderman | 428/68 |
| 6,230,444 B1 | * | 5/2001 | Pause | 52/1 |
| 2003/0054141 A1 | | 3/2003 | Worley et al. | |

* cited by examiner

*Primary Examiner*—Terrel Morris
*Assistant Examiner*—Matthew Matzek

(57) ABSTRACT

A wall covering assembly comprising a front layer of a vinyl coated fabric or paper, a rear ceramic layer, and an intermediate layer made of an acrylic compound containing finely divided phase change material such as crystalline acryl hydrocarbons or salt hydrates. The wall covering assembly facilitates thermo-regulation due to latent heat absorption and latent heat release in the phase transition range of the phase change material, which enhances the thermal comfort of rooms and leads to energy savings.

10 Claims, 2 Drawing Sheets

WALL COVERING ASSEMBLY WITH THERMO-REGULATING PROPERTIES

CROSS-REFERENCES TO RELATED APPLICATIONS

This application claims priority of U.S. provisional application Ser. No. 60/424,198 filed Nov. 5, 2002 entitled "Wallcovering materials with thermo-regulating properties". The international application Ser. No. PCT/US03/32595 entitled "Wall covering assembly with thermo-regulating properties" was filed Oct. 15, 2003.

BACKGROUND OF THE INVENTION

Wall covering materials used in homes, hotels or office buildings mainly fulfil a decorating purpose. Wall covering materials are made, for instance, of fabrics or papers with a PVC coating on one side. The vinyl coating is printed or embossed in order to create different designs and textures. Because of the thinness and high density of a wall covering material it does not contribute to the thermal insulation feature provided by the walls or ceilings the wall covering material is attached to. On the other side, the wall coverings plays an important rule in thermal interactions between the walls and the room's interior. The walls release radiant heat into the room and receive radiant heat from the room's interior parts. The wall covering is the part of the wall which is mainly involved in this thermal interaction. The radiant heat absorbed by the wall covering is transported into the walls and the ceiling by conduction. Furthermore, the heat flux from the floor to the ceiling interacts with the wall covering system in form of convective heat. As a result, being in the forefront regarding the heat exchange between the wall and the ceiling and the room interior the wall covering should be considered for providing a thermo-regulating feature. A thermo-regulating feature supplied by the wall coverings leads to an substantial improvement of the thermal comfort of rooms. Furthermore, a thermo-regulating effect provided by the wall covering system results in a decrease in air-conditioning and heating demands which leads to substantial energy savings as well. A thermo-regulating effect can be provided by the application of phase change material.

Phase change material is a highly-productive thermal storage medium which possesses the ability to change its physical state within a certain temperature range. When the melting temperature is obtained during a heating process, the phase change from the solid to the liquid state occurs. During this melting process, the phase change material absorbs and stores a large amount of latent heat. The temperature of the phase change material remains nearly constant during the entire process. In a cooling process of the phase change material, the stored heat is released into the environment in a certain temperature range, and a reverse phase change from the liquid to the solid state takes place. During this crystallization process, the temperature of the phase change material also remains constant. The high heat transfer during the melting process and the crystallization process, both without any temperature change, is responsible for the phase change material's appeal as a source of heat storage.

In order to contrast the amount of latent heat absorbed by a phase change material during the actual phase change with the amount of sensible heat in an ordinary heating process, the ice-water phase change process will be used. When ice melts, it absorbs an amount of latent heat of about 335 J/g. When the water is further heated, it absorbs a sensible heat of only 4 J/g while its temperature rises by one degree C. Therefore, the latent heat absorption during the phase change from ice into water is nearly 100 times higher than the sensible heat absorption during the heating process of water outside the phase change temperature range.

In addition to ice (water), more than 500 natural and synthetic phase change materials are known. These materials differ from one another in their phase change temperature ranges and their latent heat storage capacities.

Currently, only crystalline alkyl hydrocarbon phase change materials having different chain lengths are used for finishing yarns, textiles and foams. Characteristics of these phase change materials are summarized in Table 1.

TABLE 1

Crystalline alkyl hydrocarbons

| Crystalline alkyl hydrocarbons | Formula | Melting temperature, °C. | Crystallization temperature, °C. | Latent heat storage capacity, J/g |
| --- | --- | --- | --- | --- |
| Eicosane | $C_{20}H_{42}$ | 36.1 | 30.6 | 247 |
| Nonadecane | $C_{19}H_{40}$ | 32.1 | 26.4 | 222 |
| Octadecane | $C_{18}H_{38}$ | 28.2 | 25.4 | 244 |
| Heptadecane | $C_{17}H_{36}$ | 21.7 | 16.5 | 213 |

The crystalline alkyl hydrocarbons are either used in technical grades with a purity of approximately 95% or they are blended with one another in order to cover specific phase change temperature ranges. The crystalline alkyl hydrocarbons are nontoxic, non-corrosive, and non-hygroscopic. The thermal behavior of these phase change materials remains stable under permanent use. Crystalline alkyl hydrocarbons are byproducts of petroleum refining and, therefore, inexpensive.

Salt hydrates are alloys of inorganic salts and water. The most attractive properties of salt hydrates are the comparatively high latent heat values, the high thermal conductivities and the small volume change during melting. Salt hydrates often show an incongruent melting behaviour which results in a lack in reversible melting and freezing making them unsuitable for permanent use. Salt hydrates with reversible melting and freezing characteristics are summarized in Table 2.

TABLE 2

Salt hydrates

| Salt hydrates | Melting temperature, °C. | Latent heat storage capacity, J/g |
| --- | --- | --- |
| Calcium Cloride Hexahydrate | 29.4 | 170 |
| Lithium Nitrate Trihydrate | 29.9 | 236 |
| Sodium Sulfate Decahydrate | 32.4 | 253 |

In the present applications of the phase change material technology in textiles, only crystalline alkyl hydrocarbon are used which are microencapsulated, i.e., contained in small micro-spheres with diameters between 1 micron and 30 microns. These microcapsules with enclosed phase change material are applied to a textile matrix by incorporating them into acrylic fibers and polyurethane foams or by coating them onto textile surfaces.

U.S. Pat. No. 4,756,958 reports a fiber with integral micro-spheres filled with phase change material which has enhanced thermal properties at predetermined temperatures.

U.S. Pat. No. 5,366,801 describes a coating where microspheres filled with phase change material are incorporated into a coating compound which is then topically applied to fabric in order to enhance the thermal characteristics thereof.

U.S. Pat. No. 5,637,389 reports an insulating foam with improved thermal performance, wherein micro-spheres filled with phase change material are embedded.

The micro-encapsulation process of crystalline alkyl hydrocarbon phase change materials is a very time-consuming and complicated chemical process running over several stages making the microcapsules with enclosed phase change material very expensive.

There are several thermal effects which can be obtained by a phase change material application in a certain product, such as:
- A cooling effect, caused by heat absorption of the phase change material.
- A heating effect, caused by heat emission of the phase change material.
- A thermo-regulating effect, resulting from either heat absorption or heat emission of the phase change material.

The efficiency of each of these effects is determined by the latent heat storage capacity of the phase change material, the phase change temperature range and the structure of the carrier system.

The total latent heat storage capacity of the phase change material in a certain product depends on the phase change material's specific latent heat storage capacity and its quantity. In order to obtain a successful phase change material application, the phase change temperature range and the application temperature range need to correspond.

In addition, performance tests carried out on textiles with phase change material have shown that the textile substrate construction also influences the efficiency of the thermal effects obtained by the phase change material. For instance, thinner textiles with higher densities readily support the cooling process.

SUMMARY OF THE INVENTION

The invention pertains to a wall covering assembly, which comprises phase change materials, such as crystalline alkyl hydrocarbons or salt hydrates as a thermal storage mean. By either absorption or release of large amounts of latent heat without temperature changes, the phase change material adds a thermo-regulating feature to a wall covering system. The design of the newly-invented wall covering assembly allows for a latent heat storage capacity of up to 40 kJ/m$^2$. Applying the developed wall covering assembly to interior walls and ceilings, a phase change material is required which absorbs latent heat in a temperature range between 25° C. and 35° C. and releases heat in a temperature range between 20° C. and 30° C. The use of a wall covering assembly with thermo-regulating properties in rooms of residential or commercial buildings will lead to an enhanced thermal comfort and significant energy savings.

In order to manufacture the invented wall covering assembly an acrylic coating compound containing finely divided phase change material is applied onto the uncoated side of a paper or fabric commonly used in a conventional wall covering system. A second layer coated on top of the acrylic coating compound with phase change material consists of a liquid ceramic compound which provides the required fire resistance and a thermal resistance which minimizes the heat flux into the wall. The character and the decorative function of a common wall covering material is maintained in the invented wall covering assembly.

DETAILED DESCRIPTION OF THE INVENTION

The invention pertains to wall covering systems which are made, for instance, by a vinyl coating onto a fabric or a paper. The vinyl is then printed and embossed. The wall coverings are attached to the walls or ceilings of rooms inside residential or commercial buildings.

Figure 1:
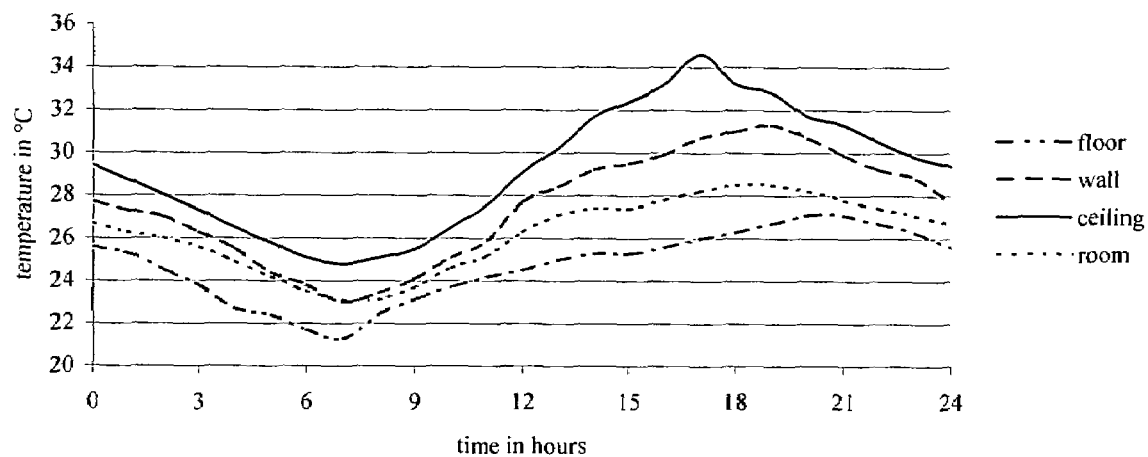
FIG. 1 is a graphical representation of the daily development of the room temperature and the average temperature of the floor, the walls and the ceiling of a model room.

The room temperature normally changes during the day and overnight. During the day, heat caused by solar radiation penetrates through the windows into the room leading to an increase in the room temperature. The heat rises to the ceiling and increases mainly the temperature at the upper parts of the walls and at the ceiling. The temperature rise in the upper part of the room leads to an increase of the temperature gradient between the floor and the ceiling. Overnight the heat is released through the windows resulting in a decrease in the room temperature and the temperatures at the ceiling, the walls and the floor. The temperature gradient between the floor and the ceiling is also reduced during the heat release overnight. Test results received for the development of the room temperature and the temperature development on different locations of a model room (floor, walls and ceiling) during a 24 hour-period are shown in FIG. 1.

A comfortable room temperature ranges between 21° C. and 24° C. Furthermore, in order to avoid uncomfortable drafts in the room, the vertical temperature gradient between floor and ceiling should not exceed 3 K/m. A vertical temperature gradient of 1 K/m would be most preferable. Based on these data the floor temperature should be in the range between 20° C. and 23° C. At the ceiling the temperature should remain between 23° C. and 26° C. during the day.

In order to keep the room temperature in the comfort range, especially on hot summer days, the phase change material should mainly be used to absorb excess heat the wall and the ceiling are subjected to. Considering the comfort temperature ranges determined for walls and ceiling the applied phase change material should absorb heat if temperature on the surface of the walls exceed 25° C. and the ceiling temperature rises above 26° C. Based on model calculations, the phase change material applied to walls should absorb latent heat in a temperature range between 25° C. and 32° C. A phase change material used in a wall covering assembly attached to the ceiling should absorb latent heat in a temperature range between 26° C. and 35° C. The phase change material selected for both applications should be able to release all the stored latent heat overnight with the reverse heat flux through the windows into the environment. Only in case the stored heat can be released completely overnight, the phase change material can fulfil its heat absorption function during the day. A appropriate temperature range for the release of the latent heat stored in the walls and in the ceiling ranges from 20° C. up to 30° C.

In order to cover the selected temperature ranges for the latent heat absorption, paraffin waxes described in Table 1 can be used for the wall covering assembly. Salt hydrates summarized in Table 2 are also suitable for such an application.

The wall covering materials are very thin and flexible. In order to keep these characteristics of the wall covering materials the amount of phase change material which can be applied to such a system is limited. The limitations in the phase change material quantity demand that technical grade paraffin waxes and salt hydrates with latent heat storage capacities of at least 180 J/g are used in wall covering systems.

Figure 2:
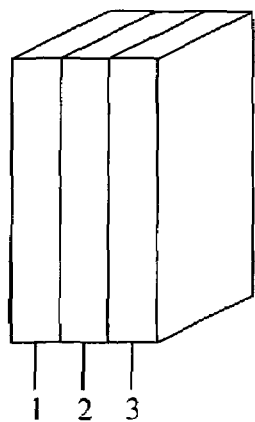
FIG. 2 is a sectional view of the invented wall covering assembly with phase change material

In order to obtain a sufficient latent heat storage capacity in the wall covering material the use of microencapsulated phase change material should be avoided. The micro-encapsulation procedure of the phase change material reduces the latent heat storage capacity by about 40%. In order to maximize the latent heat storage capacity of the wall covering assembly, pure phase change material has been applied directly to an acrylic coating compound. The acrylic coating compound is liquid at room temperature. In order to obtain an even distribution of the crystalline alkyl hydrocarbons or the salt hydrates throughout the acrylic coating compound the phase change material also have to be liquid for mixing them into the acrylic substrate. Because the crystalline alkyl hydrocarbons and the salt hydrates which melt in the selected application temperature range are solid at the processing room temperature, they need to be melted first. Then, the selected phase change material is completely melted it is carefully mixed into the acrylic coating compound. The acrylic coating compound with incorporated phase change material (2) is then applied to the uncoated side of a paper or fabric commonly used in the conventional wall covering system as a first additional layer. In addition to the phase change material the acrylic coating compound may also contain flame-retarding additives which are mixed therein together with the phase change material. In the next step, a second layer of a liquid ceramic compound (3) is coated on top of the layer comprising the acrylic coating compound with phase change material in order to enhance the wall covering's fire-resistance and avoid the dissolution of the PCM while in a liquid stage. The rear ceramic layer is abrasion resistant and possesses a plain surface. A sectional view of the invented wall covering assembly is shown in FIG. 2.

Preferably, phase change material has been applied to the acrylic coating compound in a quantity of about 50 wt. %. The total phase change material quantity of 130 g/m$^2$ in the acrylic coating compound leads to a latent heat storage capacity of approximately 25 kJ/m$^2$ to 35 kJ/m$^2$. By applying the same quantity of microencapsulated phase change material a latent heat storage capacity of only 16 kJ/m$^2$ could be obtained which is not sufficient for a room application. At least a latent heat capacity of 25 kJ/m$^2$ is necessary to obtain long-lasting thermal effects in room applications. Technical data of wall covering materials with and without phase change material are summarized in Table 3.

The test data indicate that the thin wall covering material possesses only a low thermal resistance which ensures a sufficient heat transfer into the layer which contains the phase change material and away from it. The application of 130 g/m$^2$ pure phase change material incorporated into the wall covering in an acrylic coating compound increases the weight of the wall covering material by about 70%. The application of the first additional first layer (acrylic coating compound with incorporated phase change material) doubles the thickness of wall covering material. However, the increase in thermal resistance totals only 40%.

TABLE 3

Technical data of wall covering materials with and without phase change material

| | Weight per unit area in g/m$^2$ | Thickness in mm | Thermal resistance in m$^2$K/W | Latent heat storage capacity in kJ/m$^2$ |
|---|---|---|---|---|
| Wall covering without phase change material | 365 | 0.45 | 0.0061 | — |
| Wall covering with about 130 g/m$^2$ phase change material in an acrylic coating compound | 625 | 1.02 | 0.0085 | 27.3 |
| Wall covering with about 130 g/m$^2$ phase change material in an acrylic coating compound and an additional ceramic coating | 745 | 1.22 | 0.0119 | 27.3 |

The addition of the second layer made of a ceramic compound adds about 120 g/m$^2$ in weight to the wall covering assembly. This ceramic layer possesses only a thickness of 0.2 mm. Despite its relative thinness, the ceramic compound layer possesses a comparatively high thermal resistance which reduces the heat flux into the walls and the ceiling substantially. The thermal resistance of the final wall covering configuration with phase change material is about twice the thermal resistance of the wall covering material without phase change material.

After adding the two coating layers to a existing wall covering material the invented wall covering assembly is still a flat structure which can be applied to a wall in the manner of wallpaper. The wall covering assembly is thin and flexible which makes it possible to transport and store the material in form of rolls. By keeping the original fabric or paper with the vinyl coating on the front face of the assembly the decorative design function of the wall covering is maintained.

Figure 3:
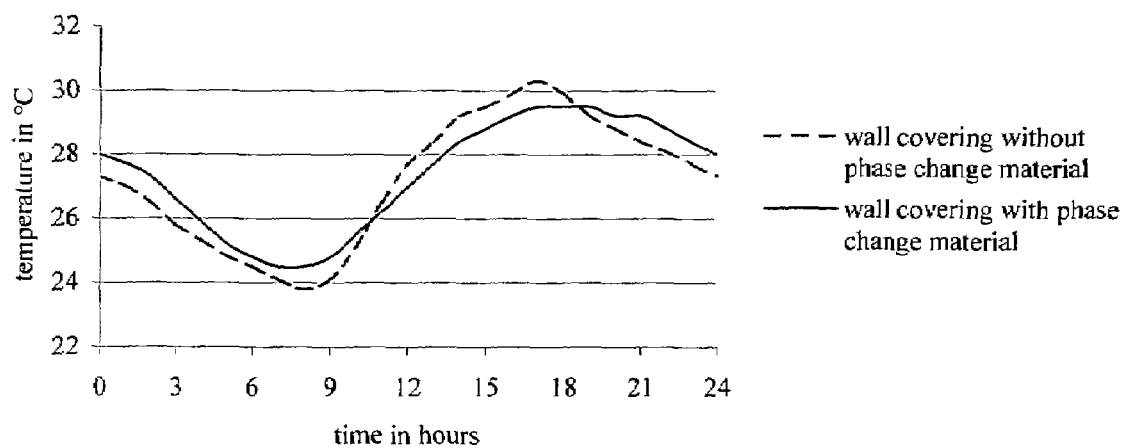
FIG. 3 is a graphical representation of a daily temperature development on walls of a model room equipped with wall coverings with and without phase change material.
Figure 4:
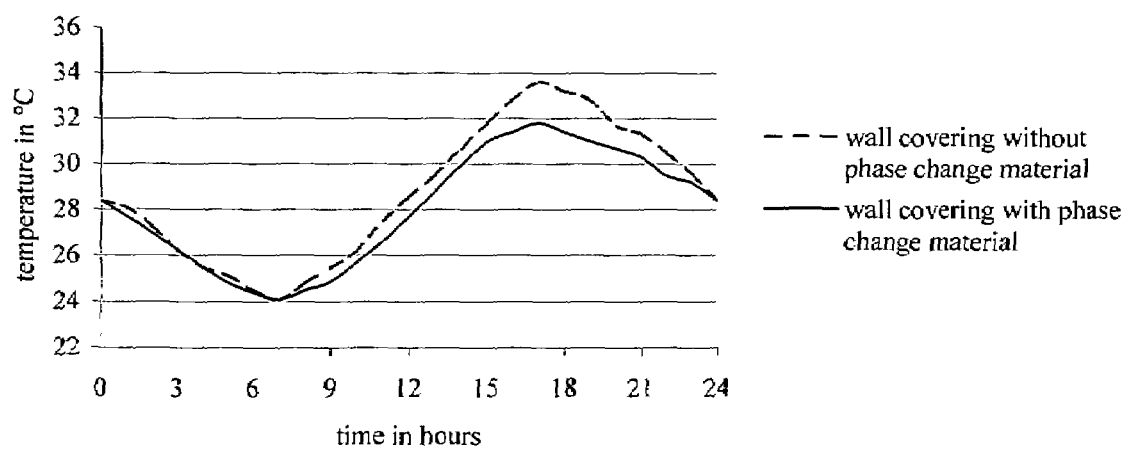
FIG. 4 is a graphical representation of a daily temperature development on the ceiling of a model room equipped with wall coverings with and without phase change material.

The wall covering material with phase change material has been tested in a model room. Some test results are shown in FIG. 3 and FIG. 4. The test results indicate that the temperature increase on the walls and the ceiling, for instance, during a hot summer day could be delayed and, therefore, reduced by the heat absorption of the phase change material incorporated in the wall covering assembly. On the other side, the phase change material has been recharged overnight by releasing the stored heat. The thermal effect provided by the phase change material contained in the wall covering assembly has been proven to be durable in more than 1000 thermo-cycles. The phase change material application in wall covering materials will lead to a better thermal comfort inside buildings and to substantial energy savings.

What is claimed is:

1. A wall covering assembly for covering a structure, such as a wall or a ceiling, comprising:
    a cover layer consisting of a fabric or paper where a vinyl coating is provided to one side and that this side confronts the viewer during use;
    an intermediate layer made of an acrylic coating compound containing finely divided phase change material;
    and a rear layer made of a ceramic compound facing the wall during use.

2. A wall covering assembly according to claim 1, wherein the acrylic coating compound comprises phase change material in a quantity of up to 60 wt. %.

3. A wall covering assembly according to claim 1, wherein the intermediate layer made of an acrylic coating compound contains flame-retarding additives in addition to the phase change material.

4. A wall covering assembly according to claim 1, wherein the acrylic coating compound with the incorporated phase change material is coated onto the side of the fabric or paper where no vinyl coating is applied.

5. A wall covering assembly according to claim 1, wherein the ceramic layer is topically applied to the acrylic compound layer with incorporated phase change material by coating.

6. A wall covering assembly according to claim 1, wherein the phase change material is a crystalline alkyl hydrocarbon.

7. A wall covering assembly according to claim 1, wherein the phase change material is a salt hydrate.

8. A wall covering assembly according to claim 1, wherein the phase change materials have melting points in the range between 20° C. and 40° C.

9. A wall covering assembly according to claim 1, wherein the phase change materials have melting points in the range between 25° C. and 35° C.

10. A wall covering assembly according to claim 1, possessing a latent heat storage capacity between 20 kJ/m$^2$ and 40 kJ/m$^2$.

* * * * *